United States Patent [19]

Martinez

[11] Patent Number: 4,915,056
[45] Date of Patent: Apr. 10, 1990

[54] AUTOMATIC DOUGH BALL FEEDING MACHINE

[76] Inventor: Gonzalo M. Martinez, 9312 Rush St., South El Monte, Calif. 91733

[21] Appl. No.: 333,303

[22] Filed: Apr. 5, 1989

[51] Int. Cl.$^4$ ............................................. B05C 1/02
[52] U.S. Cl. ................................... 118/13; 52/197; 52/750; 118/19; 118/308; 198/443; 198/550.2; 198/550.11; 221/266
[58] Field of Search ................. 52/750, 197; 221/205, 221/119, 266, 217, 218; 198/396, 397, 443, 550.2, 550.11; 118/13, 19

[56] References Cited

U.S. PATENT DOCUMENTS

| | | | |
|---|---|---|---|
| 785,932 | 3/1905 | Baltzer et al. | 221/21 |
| 2,390,195 | 12/1945 | Tascher | 118/13 |
| 2,502,779 | 4/1950 | Coons | 198/384 |
| 2,581,634 | 1/1952 | Coons | 198/383 |
| 3,468,407 | 9/1969 | Fürst | 198/443 |
| 3,523,619 | 8/1970 | Jacobsen | 52/197 |
| 3,565,234 | 2/1971 | Birdsong | 198/381 |
| 4,057,137 | 11/1977 | Hansen et al. | 198/443 |

Primary Examiner—Willard Hoag
Attorney, Agent, or Firm—John T. Matlago

[57] ABSTRACT

A V-shaped hopper is comprised of a pair of opposing linkages each formed of a lower angularly disposed rectangular plate hinged to an upper angularly disposed rectangular plate to form a hinged corner joint. Each linkage is mounted on a vertical sidewall of a rectangular opening with the bottom of its lower rectangular plate pivotally connected to the bottom thereof and with the top of its upper rectangular plate confined by retaining means thereon to move along the vertical plane thereof. Limiting means is also provided to limit the downward movement of opposing linkages when their hinged corner joints lie adjacent to each other. Upon dropping a plurality of dough balls into the V shaped hopper formed by the upper rectangular plates of the opposing linkages, one settles in the V bottom thereof and the others thereover. As a cup carried by an elevator chain is moved up along a vertical path aligned with the V bottom of the hopper, the sides of the cup contact the opposing lower rectangular plates causing the hinged corner joints of the linkages to spread apart to permit the cup to lift the dough ball thereat out of the hopper. Once the cup moves through the open bottom of the hopper, the opposing hinged corner joints return to lie adjacent to each other and the remaining dough balls in the hopper resettle therein with one in the V bottom thereof and the others positioned thereover.

15 Claims, 9 Drawing Sheets

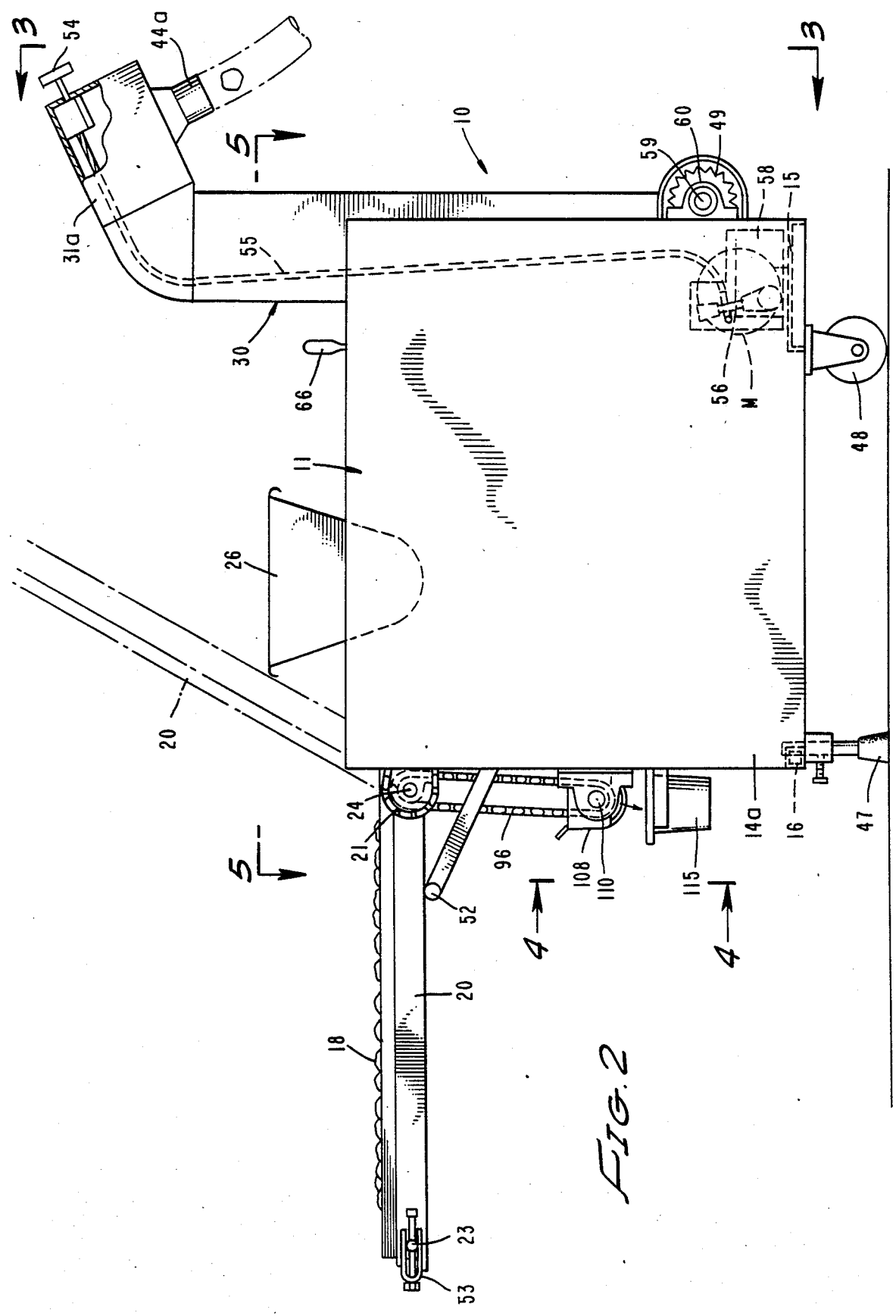

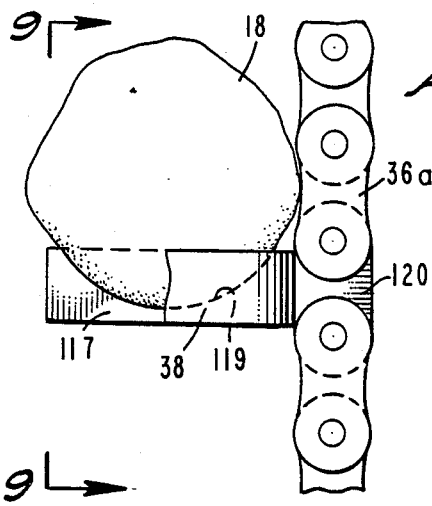
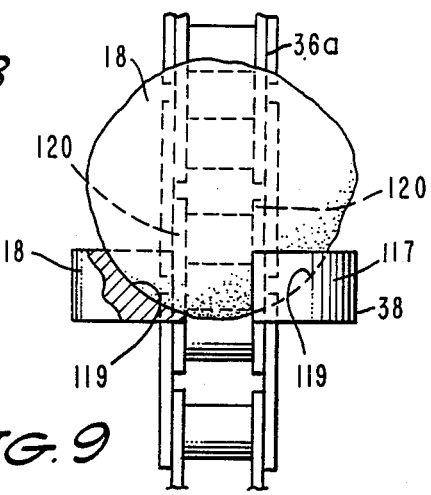
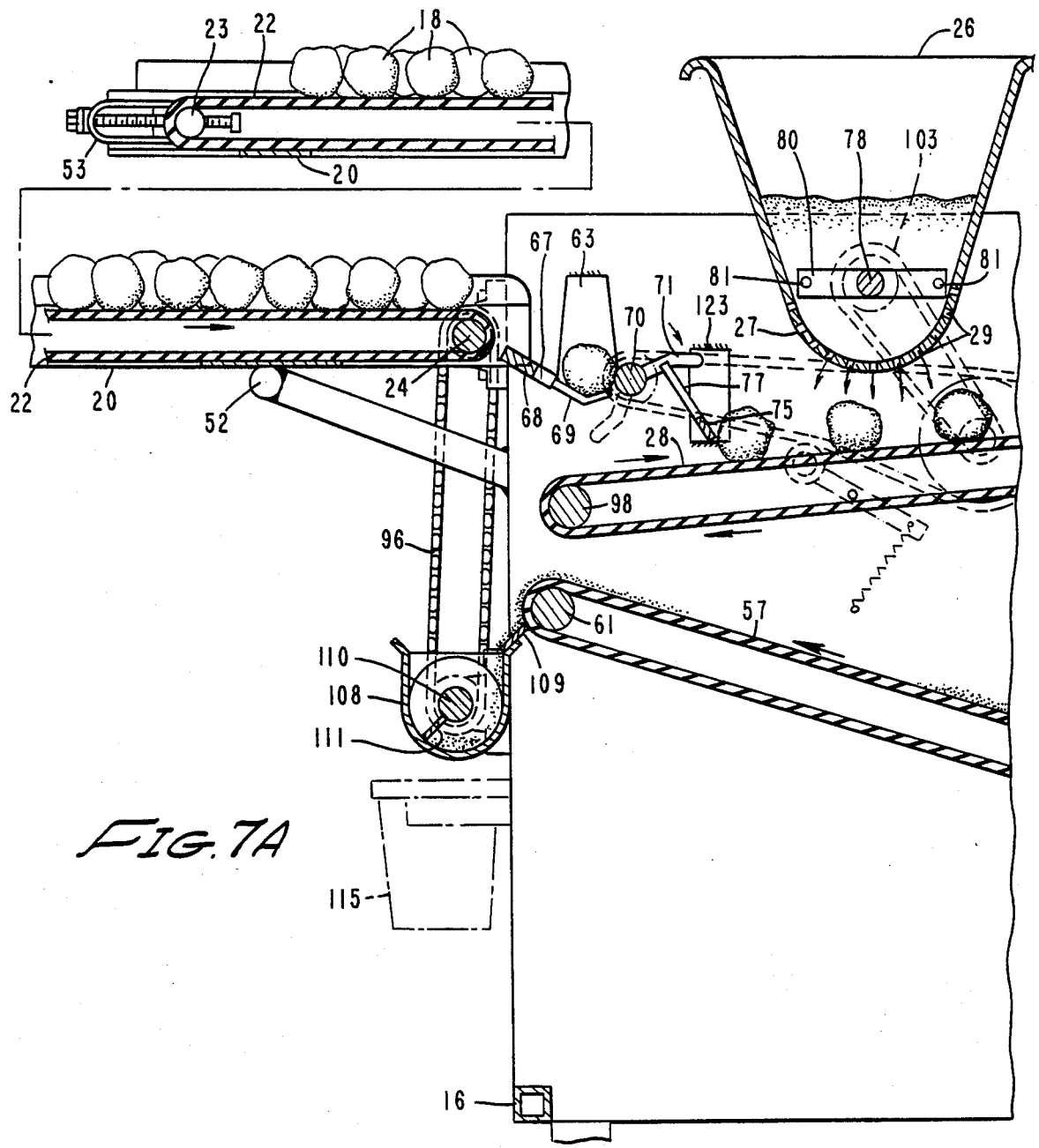

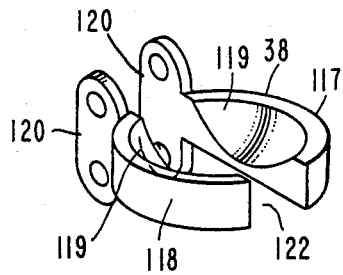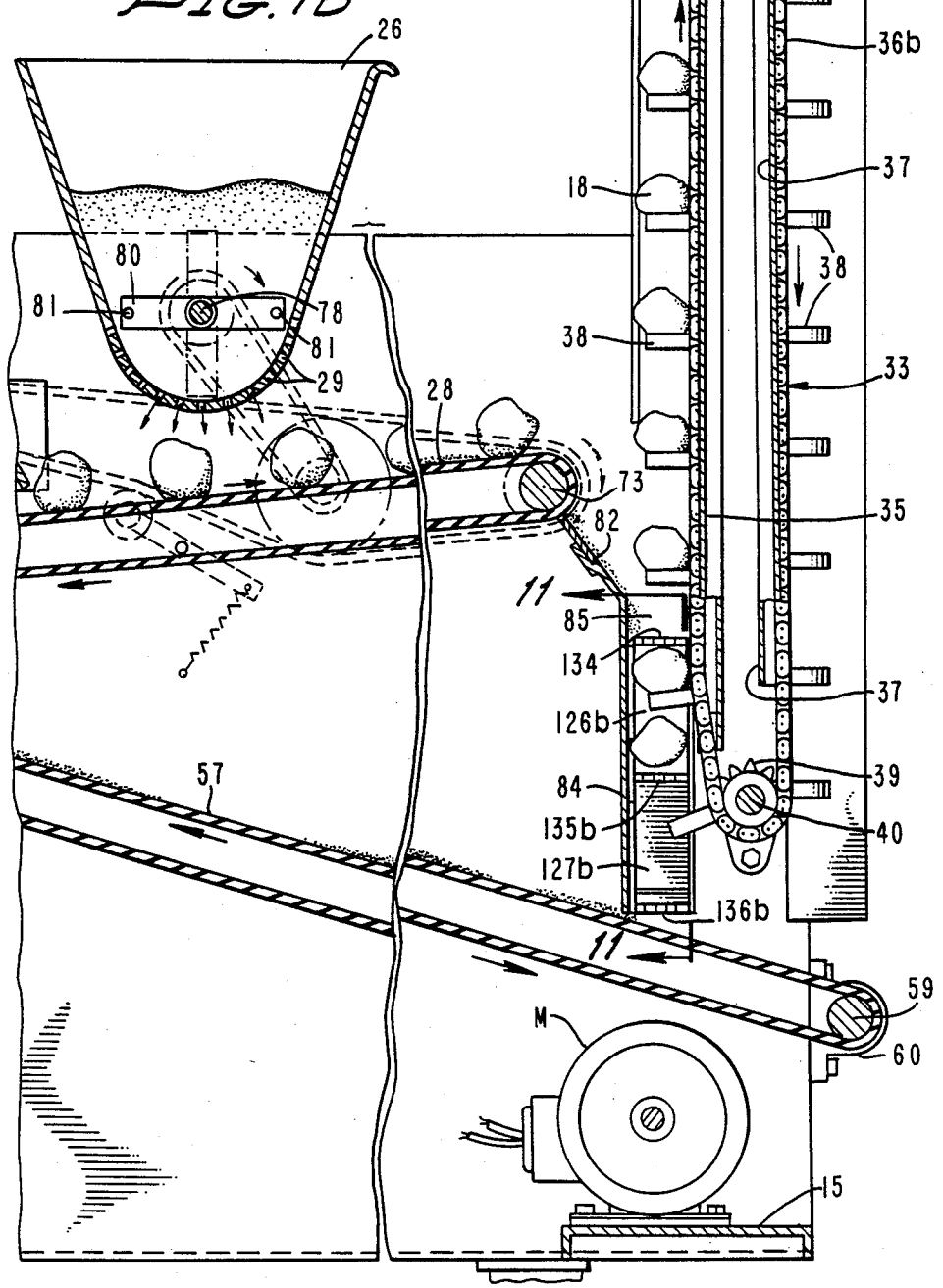

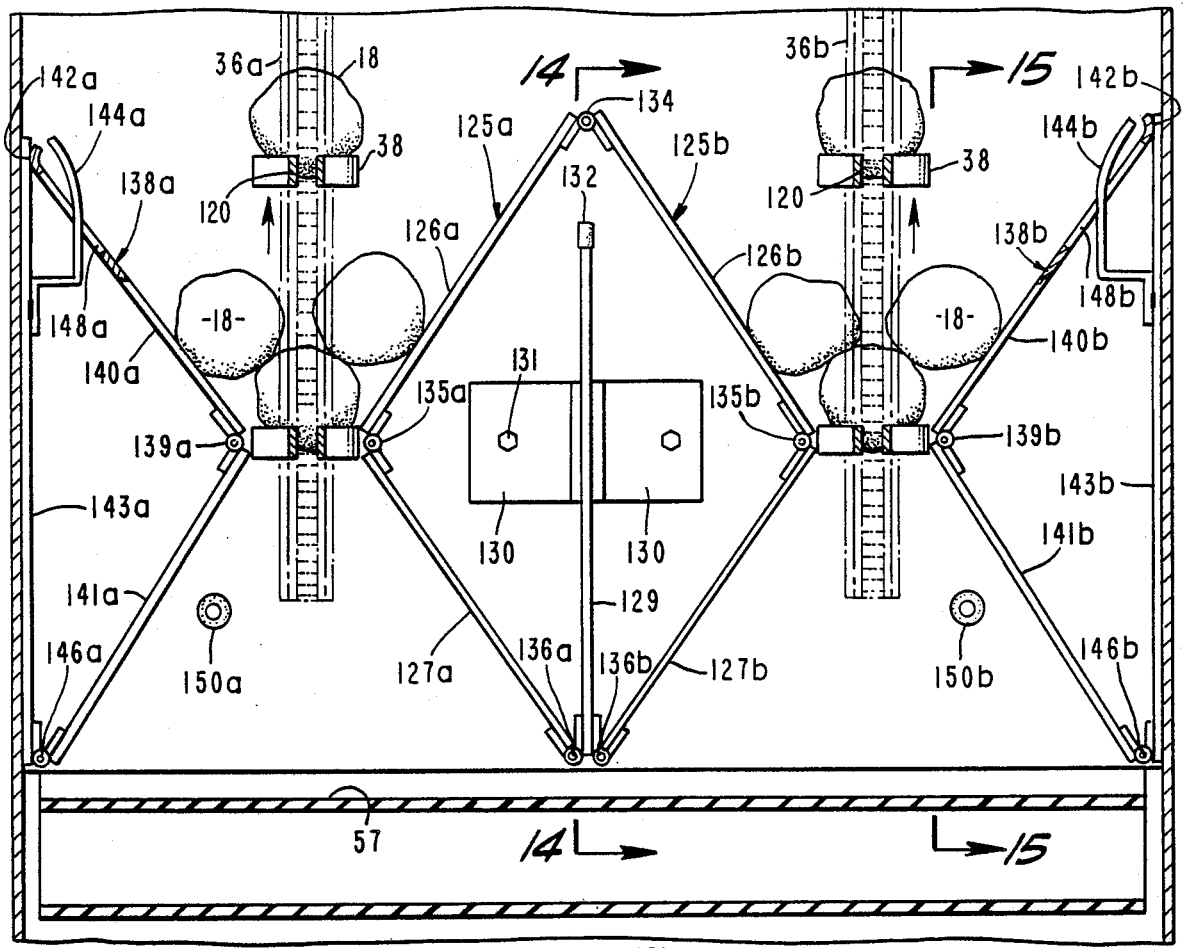
FIG. 13
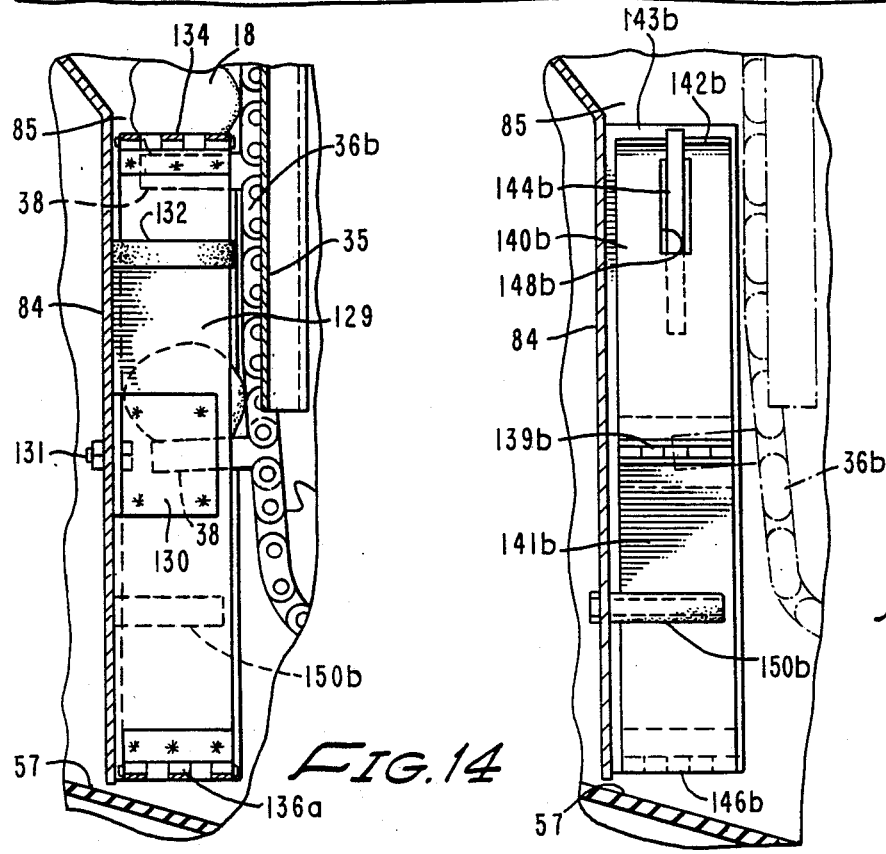
FIG. 14
FIG. 15

4,915,056

AUTOMATIC DOUGH BALL FEEDING MACHINE

BACKGROUND OF THE INVENTION

This invention relates to feeding apparatus and more particularly to apparatus for automatically feeding dough balls one at a time along one or more paths to the input of further apparatus for processing.

In accordance with the present practice, after dough balls for use in making tortillas, for example, are made up by an automatic dough ball forming machine, a tray of the dough balls is placed on a rack where they sit for a few minutes to proof, i.e., lighten the dough. A tray of dough balls is then carried from the proofing rack by an attendant and dumped onto a table, having loose flour on it, that is positioned in front of a pair of endless elevator chains each provided with cups that are used for carrying dough balls to the input of a flattening machine used for rolling the dough balls into round sheets. After first manually moving the dough balls about on the surface of the table so as to dust them with flour, the attendant then manually picks up the dough balls, one at a time in each hand, and places them onto the ascending cups of the pair of elevator chains for delivery to the input of the flattening machine. Since the need for manually feeding the dough balls in this manner to the flattening machine goes on for many hours each day, the attendant needs to be constantly working at a fast pace to make sure that he places a dough ball on each of the cups of the elevator chains.

This is especially a problem because the attendant is periodically interrupted by the need to obtain a new tray of dough balls from the proofing rack and dust the dough balls prior to again resuming the manual placing of the dough balls onto the continually advancing cups of the elevator chains.

It is thus seen that it would be highly desirable to provide an automatic dough ball feeding machine that could carry out the operations that the attendant has been manually performing, such as dusting the dough balls with flour and placing them one at a time on each of the advancing cups of the elevator chains. It should be noted that the step of proofing the dough balls would be eliminated because of the time that it would take for the dough balls to pass through the automatic dough ball feeding machine before entering the flattening machine.

SUMMARY OF THE INVENTION

In accordance with the present invention, a rectangular opening for enclosing a pair of side-by-side V shaped hoppers is formed by front and rear vertical transverse walls, vertical sidewalls, and a central vertical wall which partitions the rectangular opening in half. The V shaped hopper in each half of the rectangular opening is formed by mounting a central linkage on each side surface of the central vertical wall and an end linkage on each vertical sidewall. Each of the end and central linkages is identical in that it includes a lower angularly disposed rectangular plate joined by a hinge to an upper angularly disposed rectangular plate to form a hinged corner joint. The central linkage mounted on each side of the central vertical wall has the bottom of its lower angularly disposed rectangular plate pivotally connected to the bottom of its side of the central vertical wall and has the top of its upper angularly disposed rectangular plate hinged to the top of the upper angularly disposed rectangular plate of the central linkage located on the opposite side of the central vertical wall. The end linkage mounted on each vertical sidewall has the bottom of its lower angularly disposed rectangular plate pivotally connected to the bottom of its vertical side wall and has the top of its upper angularly disposed rectangular plate confined by retaining means on its vertical sidewall to movement along the surface thereof. It should now be clearly understood that the upper angularly disposed rectangular plates of the opposing end linkage and central linkage in each half of the rectangular opening form a V shaped hopper with the opposing hinged corner joints thereof forming the V bottom thereof. Means are provided for limiting the downward movement of each of the linkages about its bottom pivotal connection such that their inwardly directed opposing hinged corner joints are positioned adjacent to each other in their lowermost or rest position.

Mounted on the rear wall of each half of the rectangular opening is an endless elevator chain carrying spaced cups along vertical paths aligned with the V bottoms of the pair of hoppers. Each V shaped hopper has a plurality of dough balls therein, one located in the V bottom thereof and the remaining located thereabove. Thus as a cup carried at the same level on each elevator chain ascends its sides contact the respective lower angularly disposed rectangular plates of each of the hoppers thereby causing them to pivot about their bottom connections and spread apart their hinged corner joints that form the V bottoms of each of the hoppers. This causes the top of the opposing upper angularly disposed rectangular plates forming each of the hoppers to move upwardly in the planes of the vertical walls on which they are mounted. As the cups pass through the spread apart V bottoms of each of the hoppers, the dough balls thereat seat in the cups and are carried upwardly as the elevator chains continue to advance. Once the cups pass through the open V bottoms, since they no longer exert an upward pivoting force on the opposing lower angularly disposed rectangular plates, gravity causes the opposing hinged upper and lower angularly disposed rectangular plates to move back down to their rest position and the opposing inwardly directed hinged corner joints of the hoppers to move inwardly toward each other to thereby close the V bottoms of the hoppers. In the meantime, the dough balls remaining in each of the hoppers move out of the paths of the cups and immediately resettle therein with one located in the V bottom of each and the others located thereabove. As each dough ball is successively carried by its elevator chain to the top of its travel it falls into a chute that directs it to the desired spot at the input of the flattening machine.

The apparatus of the present invention further includes a ledge structure formed of a row of spaced upwardly bent fingers that is located at the end of an endless input conveyor belt carrying thereon closely spaced randomly positioned dough balls. The dough balls being carried by the input conveyor belt are dropped and momentarily held on the ledge structure before being simultaneously lifted by a plurality of rotating fingers that pass between the upwardly bent fingers and transfer the dough balls onto spaced declining rod members that guide them onto the surface of a faster moving second conveyor belt. As a result, each row of dough balls on the second conveyor belt is longitudinally spaced from the previously deposited row of dough balls. The rows of dough balls on the second conveyor belt are then advanced underneath a flour trough which serves to dust flour on them. When the dough balls in each transverse row reach the end of the second conveyor belt they fall into the rectangular opening that encloses the pair of side-by-side V shaped hoppers.

Accordingly, one of the objects of the present invention is to provide an automatic dough ball feeding mechanism which reliably picks up one dough ball at a time from a plurality of dough balls being held in each of a pair of V shaped hoppers and delivers the dough balls along each of a pair of parallel paths to a place of use.

Another object of the present invention is to provide a V shaped hopper comprised of a pair of opposing hinged structures which cooperate with a cup being carried by an elevator chain for enabling a dough ball lying in the V bottom thereof to be automatically picked up by the cup and conveyed out of the hopper to a chute which delivers it to a place of use.

Another object of the present invention is to provide for receiving dough balls that are falling off the rear of a moving input conveyor belt on which they are closely positioned in a random manner and transferring them such that they are deposited on a second moving conveyor belt in transverse rows that are longitudinally spaced from each other.

Another object of the present invention is to provide an automatic dough ball feeding machine in which the dough balls are not likely to jam or clog during the operation thereof.

Yet, another object of the present invention is to provide an automatic dough ball feeding machine that is compact, easily moved about, and easily cleaned.

These and other objects, features and advantages of the present invention will be made more readily apparent from the following detailed description of the preferred embodiment as illustrated in the accompanying drawings.

BRIEF DESCRIPTION OF THE DRAWINGS

FIG. 2 is a side view of the machine;

FIG. 7A is a longitudinal sectional view of the front portion of the machine as taken along line 7—7 of FIG. 3;

FIG. 7B is a longitudinal sectional view of the rear portion of the machine as taken along line 7—7 of FIG. 3;

FIG. 8 is a side view showing of a cup mounted on the elevator chain;

FIG. 9 is a front view of the cup and elevator chain as taken along line 9—9 of FIG. 8;

FIG. 10 is a perspective view of the two mating halves of a cup when separated from the elevator chain;

FIG. 13 is a rear elevation view of the V shaped hoppers showing the ascending cup on each of the elevator chains as they are being moved through the open V shaped bottoms thereof and picking up the dough balls located thereat;

FIG. 14 is a view of the central vertical wall as taken along line 14—14 of FIG. 13; and FIG. 15 is a view of an end linkage of a hopper as taken along line 15—15 of FIG. 13.

DESCRIPTION OF THE PREFERRED EMBODIMENT

Figure 1:
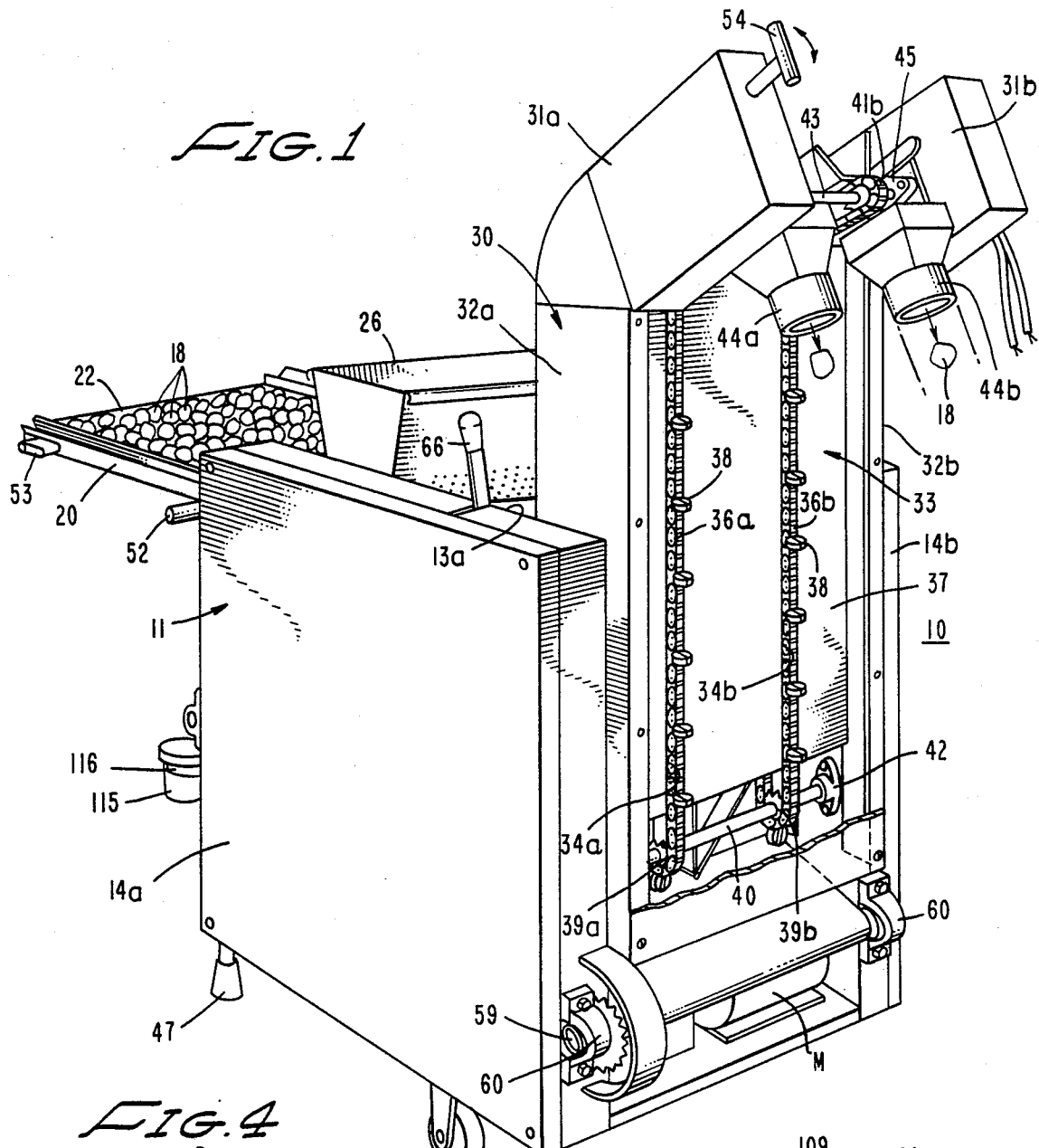
FIG. 1 is a rear side perspective view of the dough ball feeding machine of the present invention.
Figure 3:
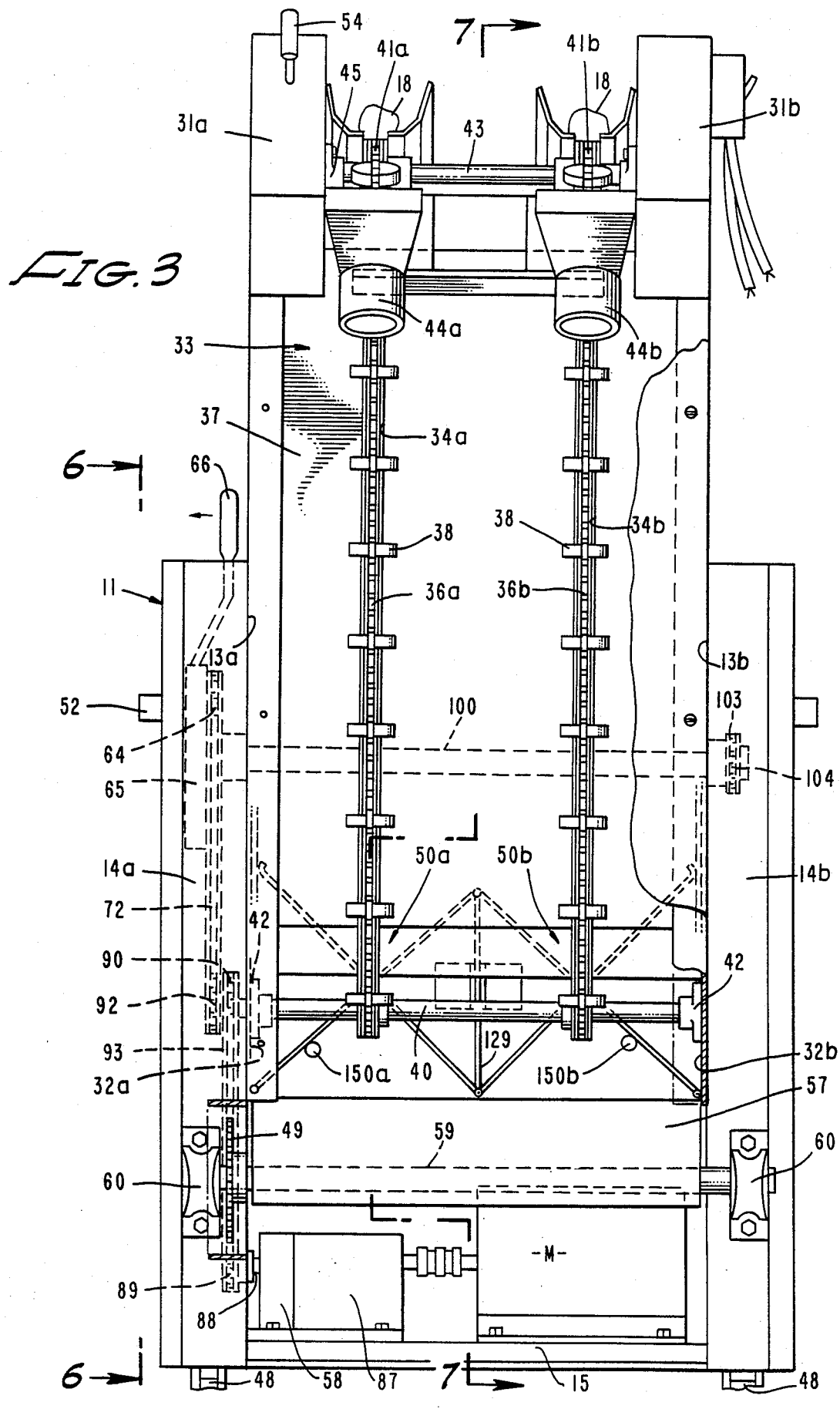
FIG. 3 is a rear view of the machine as taken along line 3—3 of FIG. 2.

Reference will first be made to FIGS. 1 through 3 to describe the dough ball feeding machine 10 of the present invention. As shown in FIG. 1, the machine 10 includes a frame housing 11 comprised of transversely spaced sidewalls 13a and 13b having side compartments 14a and 14b on the respective outer surfaces thereof. The sidewalls 13a and 13b are held together at the rear bottom thereof by a transverse base plate 15 and at the front bottom thereof by a transverse rod 16 (FIG. 2). As will be hereinafter described in connection with FIGS. 5 and 6, a chain system for driving the rotating elements of the machine is enclosed within the side compartments 14a and 14b.

As shown in FIGS. 1 and 2, a cantilevered shelf 20 for an endless input conveyor belt 22 is pivotally held on the front upper end of the frame housing 11 by a shaft 24 journalled on bearing members 25 (FIG. 5) provided on the front walls of the side compartments 14a and 14b. A flour trough 26 is mounted to extend above the frame housing 11 with its lower end portion located between the sidewalls 13a and 13b. In addition, an elevator housing 30, provided with side elbow enclosures 31a and 31b on the top thereof, is mounted between the sidewalls 13a and 13b at the rear of the frame housing 11. The elevator housing 30 encloses an inner support structure 33 having an upper curved end portion which extends rearwardly into the space between the side elbow enclosures 31a and 31b. The surfaces of the front and rear walls 35 and 37 of the inner support structure 33 have a pair of spaced vertical channels 34a and 34b (FIG. 5) formed thereon for guiding a pair of endless elevator chains 36a and 36b carrying cups 38 that are equally spaced along the lengths thereof. The elevator chains 36a and 36b, which are moving downwardly as viewed in FIGS. 1 and 3, pass down around lower sprocket wheels 39a and 39b keyed on a drive shaft journalled on bearing members 42 provided on the inner sides of the elevator housing 30. The elevator chains 36a and 36b then travel vertically upwardly within the elevator housing 30 and into the space between the side elbow enclosures before passing around upper sprocket wheels 41a and 41b keyed on a shaft 43 journalled on bearing members 45 provided on the inner sides of side elbow enclosures 31a and 31b. As the elevator chains 36a and 36b move up into the elevator housing 30, they cause successive pairs of cups 38 being carried thereon at the same level to simultaneously open the V shaped bottoms of a pair of hoppers 50a and 50b located on each half side of the bottom portion of elevator housing 30. As will be described hereinafter, as the ascending cups 38 open up the V bottoms of the hoppers they pickup dough balls located thereat and lift them through the respective hoppers and on up through the elevator housing 30 into the area between the side elbow enclosures 31a and 31b where they fall into chutes 44a and 44b which direct them into the input (not shown) of a conventional machine used for flattening the dough balls to make tortillas.

Figure 6:
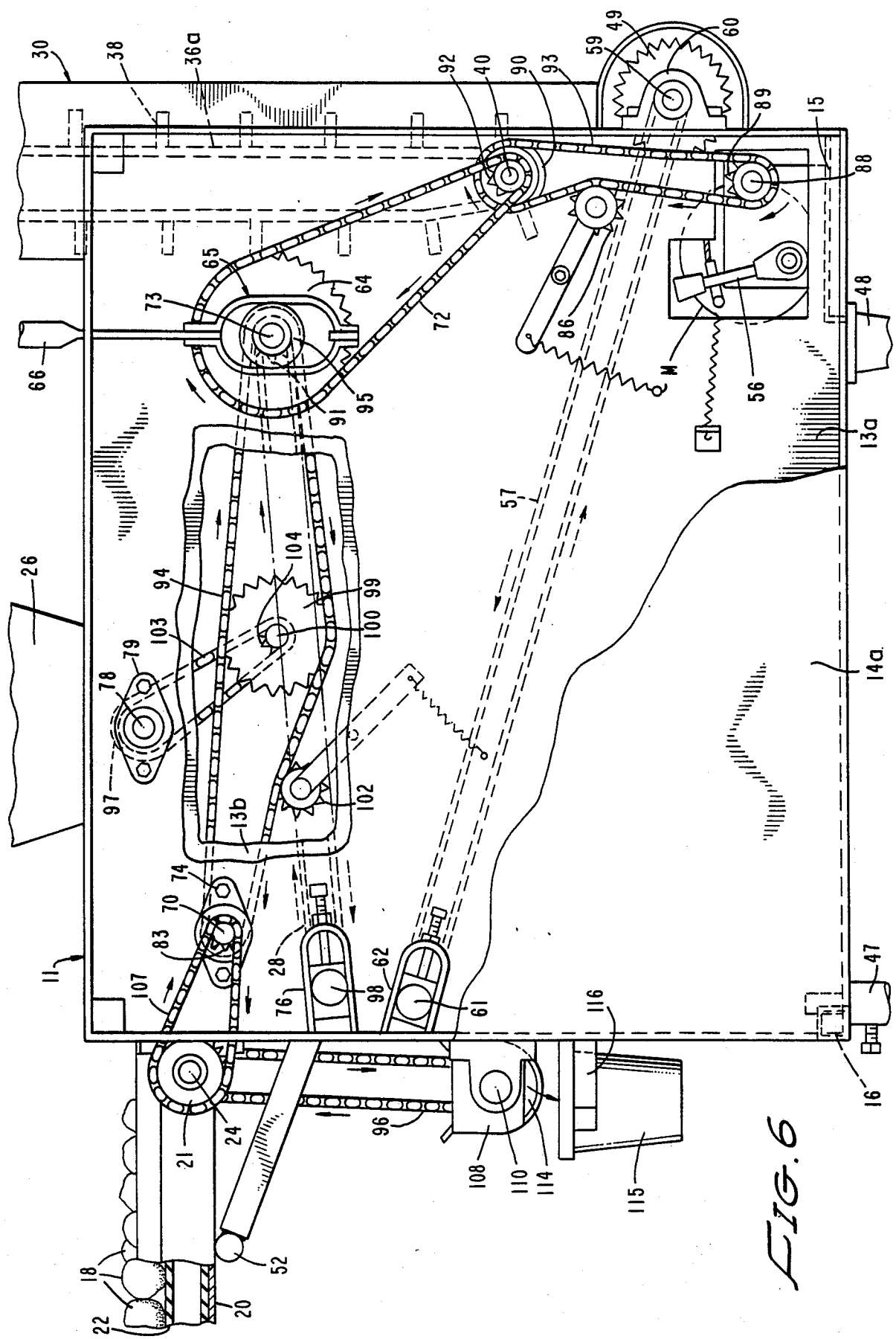
FIG. 6 is a view of a side compartment of the machine as taken along line 6—6 of FIG. 3.

As noted in FIGS. 1 and 2, the front bottom corners of the frame housing 11 are provided with adjustable feet 47 and the rear bottom corners thereof are provided with wheels 48. The cantilevered shelf 20 on which the input conveyor belt 22 is mounted is pivotally held on a shaft 24 journalled on the front walls of the side compartments 14a and 14b. When in operable position, the shelf 20 rests on a transverse handle 52 attached to the front of the frame housing 11. Thus, by swinging the shelf 20 up and around on shaft 24 so that it lies against the front edge of the flour trough 26, the transverse handle 52 is exposed for use in lifting the front end of the frame housing 11 so that it can be moved on its rear wheels 48 to a place of work. Also shown in FIG. 2 is a knob 54 on the outer end of the enclosure for the side elbow 31a provided on the top of elevator housing 30. This knob 54 is coupled by a cable 55 to a rotatable arm 56 of a speed control unit 58 on a gear box 79 driven by a motor M mounted on base plate 15. Also shown mounted on the top of the side compartment 14a is a handle 66 for a clutch 65 (FIG. 6). As will be described hereinafter, the clutch 85 can be used to disengage all the chain drives that are being used in the machine in the course of advancing the dough balls 18 into the hoppers 50a and 50b, leaving only the drive for the elevator chains 36a and 36b operable to advance the cups 38 to individually lift out of the hoppers the dough balls that have already been transferred therein.

Figure 5:
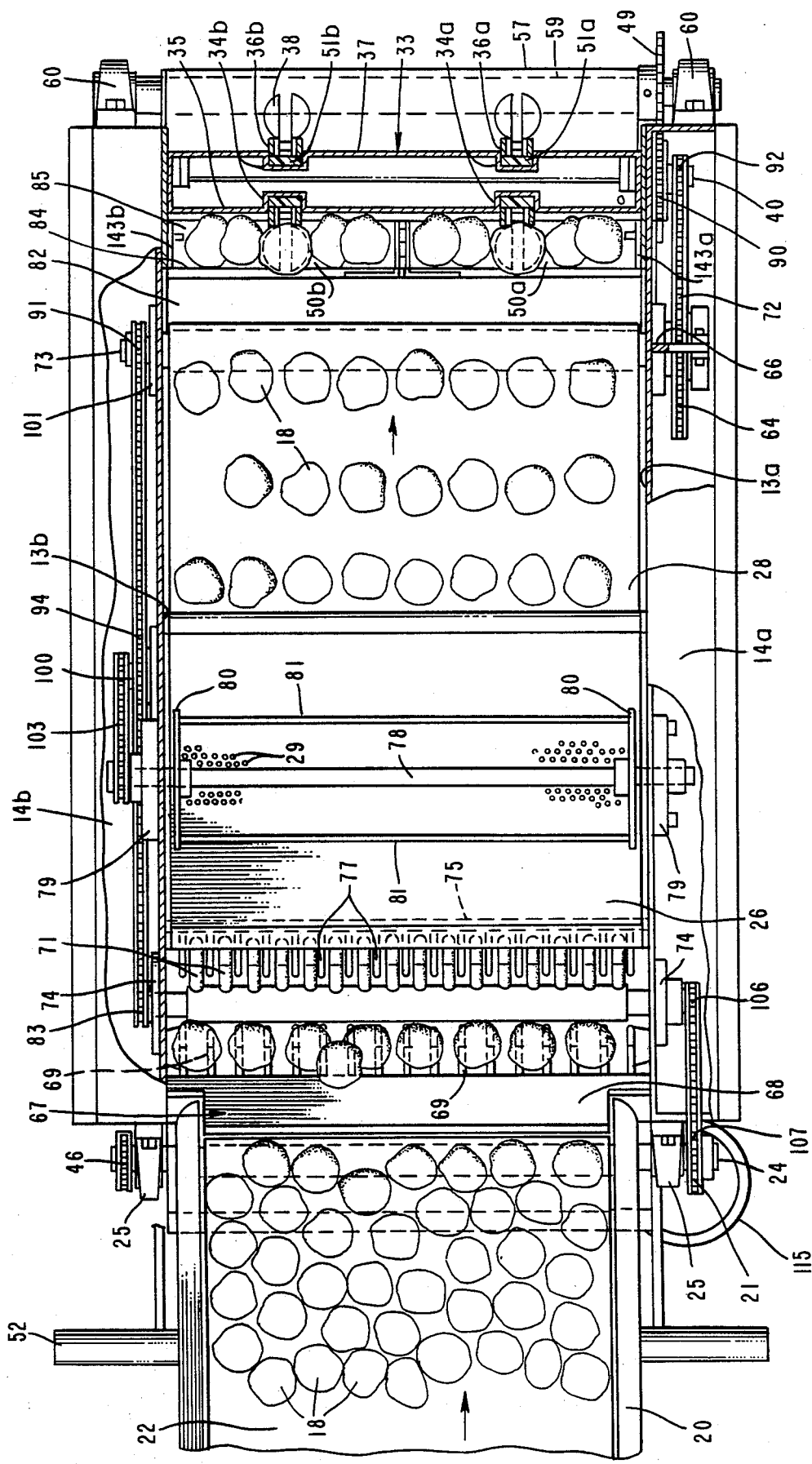
FIG. 5 is a top plan view of the machine as taken along line 5—5 of FIG. 2.

Reference will next be made to FIG. 5 which shows a top plan view of the machine 10 as taken along line 5—5 of FIG. 3, and also to FIGS. 7A and 7B which show an enlarged longitudinal sectional view of the machine as taken along line 7—7 of FIG. 3. The endless input conveyor belt 22 is driven by the shaft 24 provided on the pivotal inner end of the shelf 20 on which belt 22 is mounted so that it travels about a shaft 23 (FIG. 2) that is journalled on adjusters 53 provided on either side of the outer end of shelf 20. The adjusters 54 are used to take up any slack in the belt 22. Mounted by brackets 63 on the sidewalls 13a and 13b of frame housing 11 so as to be positioned adjacent the rear end of the input conveyor belt 22 is a ledge structure 67 comprised of a declining transverse plate 68 having seventeen upwardly bent stationary fingers 69 evenly spaced along the width of the lower edge thereof. Mounted on bearing members 74 attached on the sidewalls 13a and 13b just rearwardly of the ledge structure 67 is a rotatable shaft 70 carrying a row of sixteen evenly spaced rotatable bent fingers 71 along the length thereof which fingers when rotated pass through the spacings of the stationary bent fingers 69. Note that when a dough ball 18 falls from the input conveyor belt onto the ledge structure 67 it can reside in the space between any adjacent pair of stationary fingers 69. Thus, the rotating fingers 71 pass through the spacings between all of the stationary fingers 69 to make sure that all dough balls lying thereon are lifted off the ledge structure 67 regardless of which adjacent pair of stationary fingers 69 they may be resting on. Mounted by brackets 123 on sidewalls 13a and 13b below and to the rear of the rotatable shaft 70 is a transverse plate 75 having on the top edge thereof seventeen equally spaced rods 77 extending up toward the shaft 70. It should now be clear that after the rotating bent fingers 71 pass up through and lift the dough balls lying in the spacings between the stationary upwardly bent fingers 69 they transfer these dough balls onto the rods 77 as they pass down between the latter. The rods 77 thus serve to direct the dough balls onto the input end portion of a second endless conveyor belt 28 which is driven by a shaft 73 supported by bearing members 101 located on the outer surface of the sidewalls 13a and 13b near the rear of frame housing 11. The travel of the second endless conveyor belt 28 extends about a shaft 98 journalled on adjusters 76 (FIG. 6) provided on the outer sidewalls 13a and 13b near the front end of the frame housing 11.

Next to be described is the trough 26 filled with flour that is mounted on the frame housing 11 above the second conveyor belt 28. As best seen in FIG. 7A, the flour trough 26 has a shaft 78 extending transversely through the center of a circular bottom portion 27 thereof which is provided with perforations 29. The shaft 78 is rotatably mounted on bearing members 79 (FIG. 5) provided on the frame housing sidewalls 13a and 13b. Attached to each end portion of the shaft 78 within the trough 26 is a diametric side bar 80. A transverse rod 81 is connected across each of the corresponding outer ends of side bars 80. When shaft 78 is rotated, the transverse rods 81 move past the internal wall of the circular bottom portion 27 of the trough 26, and force flour through the perforations 29 thereon.

As shown in FIG. 7B, located at the rear end of the second conveyor belt 28 is a scraper member 82 whose lower end is attached to the upper forwardly bent edge of a vertical wall 84 that forms the front of a rectangular opening 85 provided on the bottom front portion of the elevator housing 30 in which the V shaped hoppers 50a and 50b reside. As shown in FIG. 7B, the back wall 35 of the rectangular opening 85 is the lower portion of the wall that forms the front wall of the inner support structure 33 which has the channels 34a and 34b formed thereon for guiding the elevator chains 36a and 36b.

As shown in FIGS. 7A and 7B, located to extend angularly upwardly within the frame housing 11 from below the rear of the elevator housing 30 to the front of frame housing 11 is a third endless conveyor belt 57 which is driven by a shaft 59 supported by bearing members 60 mounted on the lower rear walls of the side compartments 14a and 14b. The other end of the third conveyor belt 57 extends about a shaft 61 journalled on adjusters 62 (FIG. 6) attached on the sidewalls 13a and 13b near the front middle of the frame housing 11.

Figure 4:
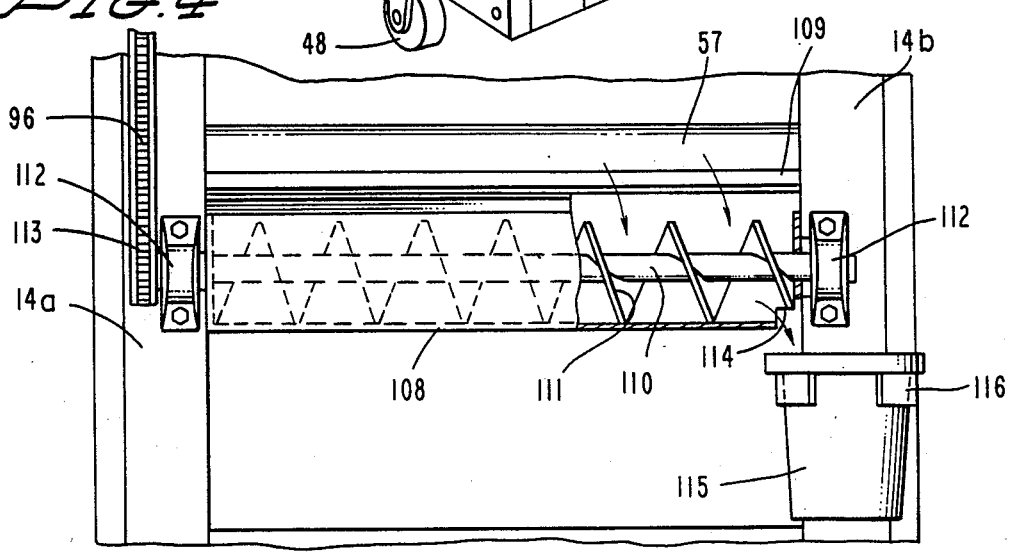
FIG. 4 is a view of the flour recovery collector provided on the front of the machine as taken along line 4—4 of FIG. 2.

As shown in FIG. 4, mounted on the front of the frame housing 11 is an elongated collector 108 having a U shaped cross section. A scraper 109 is attached to the back transverse side of the collector 108 so as to contact the surface of conveyor belt 57 as it starts its return travel. A shaft 110 with a large diameter helical blade 111 thereon is located within the collector 108 with its ends extending through the sides thereof and mounted by bearing members 112 to the front of side compartments 14a and 14b. The end of the shaft 110 mounted on the front of side compartment 14a is provided with a sprocket wheel 113. The bottom end of the collector 108 to which the loose flour is carried by the helical blade 111 is provided with a hole 114 which is located above, the top of a bucket 115 which is detachably held on a holder 116 provided on the front of the side compartment 14a.

Next to be described are the V shaped hoppers 50a and 50b and their structural relationship with the elevator chains 36a and 36b carrying cups 38, as shown in FIGS. 5 and 7B. The vertical back wall 35 of the rectangular opening 85 in which the hoppers reside is parallel to and spaced from the front wall 84 thereof to permit the dough balls 18 to freely pass into the hoppers with a clearance therebetween. As previously described, the vertical back wall 35 of the rectangular opening 85 is also the front inner wall 35 of the inner support structure 33 that is mounted within the elevator housing 30 and provided with the channels 34a and 34b used to guide the pair of endless elevator chains 36a and 36b. As shown in FIG. 5, the spaced parallel guide channels 34a and 34b formed on the front wall 35 and rear wall 37 of the inner support structure have a nylon strip 51a and 51b attached on the bottoms thereof on which the elevator chains 36a and 36b ride. Upon the elevator chains 36a and 36b passing up over the upper sprocket wheels 41a and 41b located on shaft 43 mounted between the side elbow enclosures 31a and 31b, and continuing downwardly on the underside of the rearwardly curved end portions of the guide channels 34a and 34b provided on the back wall 37, their front surfaces ride on nylon plates 121a and 121b that are attached thereto for keeping the chains 36a and 36b in the guide channels 34a and 34b. It should be noted that the cups 38 would be prevented from moving in the channels 34a and 34b past the nylon plates 121a and 121b if the central slots 122 (FIG. 10) were not provided thereon.

It should now be clearly understood that the channels 34a and 34b are used to define the closed loop paths of the endless elevator chains 36a and 36b carrying the cups 38 that are continuously advancing upwardly to open up the V bottoms of the hoppers 50a and 50b and lift the dough balls located thereat up to the chutes 44a and 44b.

Reference will next be made to FIGS. 3, 5 and 6 to describe the chain drive system provided for rotating the different elements of the machine. As shown in FIGS. 3 and 6, the motor M is coupled to drive a gear box 87 that provides a main drive shaft 88 having a main drive sprocket wheel 89 rotated in a clockwise direction. The shaft 40 which is rotatably mounted on bearing members 42 provided on the sidewalls 32a and 32b of the elevator housing 30 and provided with sprocket wheels 39a and 39b for driving the elevator chains 36a and 36b is further provided with an end sprocket wheel 90 keyed thereto which is coupled to be driven by a chain 93 coupled to the main drive sprocket wheel 89. The chain 93 which has its slack taken up by a spring loaded sprocket wheel 86 (FIG. 6) also drives a sprocket wheel 49 on shaft 59 which is journalled on bearing members 60 attached to the lower rear of the side compartments 14a and 14b on frame housing 11 to advance the third endless conveyor belt 57 in its travel about shaft 61.

Mounted within the side compartment 14a of the frame housing 11 is a clutch 65 provided with a handle 66 that extends above the top of side compartment 14a. The clutch 65 comprises a large gear 64 which freely rotates on shaft 73 mounted by bearings members 101 on the sidewalls 13a and 13b (FIG. 5). Gear 64 is coupled by a chain 72 to a drive sprocket wheel 92 on shaft 40 which drives the endless elevator chains 36a and 36b.

Keyed on the end of shaft 73 adjacent gear 64 is a fiber disc 95. A smaller sprocket wheel 91 is keyed on the opposite end portion of shaft 73 which extends into the side compartment 14b. Thus, when the handle 66 of clutch 65 is pushed inwardly it serves to lock the fiber disc 95 against the hub of gear 64 thereby causing the shaft 73 to rotate and drive sprocket wheel 91 thereby advancing the second endless conveyor belt 28 in its travel about shaft 98. As previously described, the shaft 70 carrying rotating fingers 71 is journalled on bearing members 74 attached to the outer sidewalls 13a and 13b of the frame housing 11. This shaft 70 has a sprocket wheel 83 thereon which enables it to be rotatably driven by a chain 94 that links it to sprocket wheel 91 on shaft 73 when the clutch 65 is engaged. The chain 94 has a large sprocket wheel 99 mounted on a shaft 100 journalled on bearing members 105 provided on the sidewalls 13a and 13b such that the sprocket wheel 99 is engaged between the oppositely travelling portions of chain 94. In addition, a spring loaded sprocket wheel 102 provides for engaging chain 94 to take up any slack it might have.

As previously described, the flour trough 26 has therein a pair of transversely held rods 81 which are connected on the ends of diametric side bars 80 to the shaft 78 mounted on bearings members 79 on the sidewalls 13a and 13b of the frame housing 11. An end portion of shaft 78 which extends into side compartment 14b has a sprocket wheel 97 keyed thereto which is coupled by a chain 103 to a sprocket wheel 104 engaged on the end of shaft 100.

The shaft 70 for rotating the fingers 71 which is driven by chain 94 in side compartment 14a is provided on the opposite end thereof in side compartment 14a with a sprocket wheel 106 and chain 107 to drive the sprocket wheel 21 keyed on shaft 24 to drive the input conveyor belt 22. An additional sprocket wheel 46 on the opposite end of shaft 24 is provided with a chain 96 which engages a sprocket wheel 113 on the end of shaft 110 provided with the helical blade 111 that rotates within the collector 108 to advance the excess flour therein to a bucket 115 detachably mounted on a holder 116 provided on the front of side compartment 14a on the frame housing 11.

Next to be described are the cups 38 provided on the pair of elevator chains 36a and 36b provided for lifting one dough ball 18 at a time from each of the hoppers 50a and 50b. As shown in FIG. 10, each cup 38 is made up of a pair of mating half castings 117 and 118. Each half casting comprises a circular portion having a concave upper surface 119 and a link 120 for a segment of a conventional elevator chain integrally formed on the rear edge thereof. As shown in FIGS. 8 and 9, each of the mating half castings 117 and 118 has its link 120 mounted in place of a conventional link on either side of a segment of chain 36a or 36b, such that the cup 38 thus formed has a central slot 122. The half castings 117 and 118 shown in FIG. 10 are positioned next to each other as they would be when their links 120 are attached on the opposite sides of a chain 35a or 35b with the slot 122 provided therebetween. It should be further noted that the cups 38 are mounted on their chains 36a and 36b so as to be spaced from each other by four links of the chain. Moreover, the cups on the two chains 36a and 36b are at the same levels.

Figure 11:
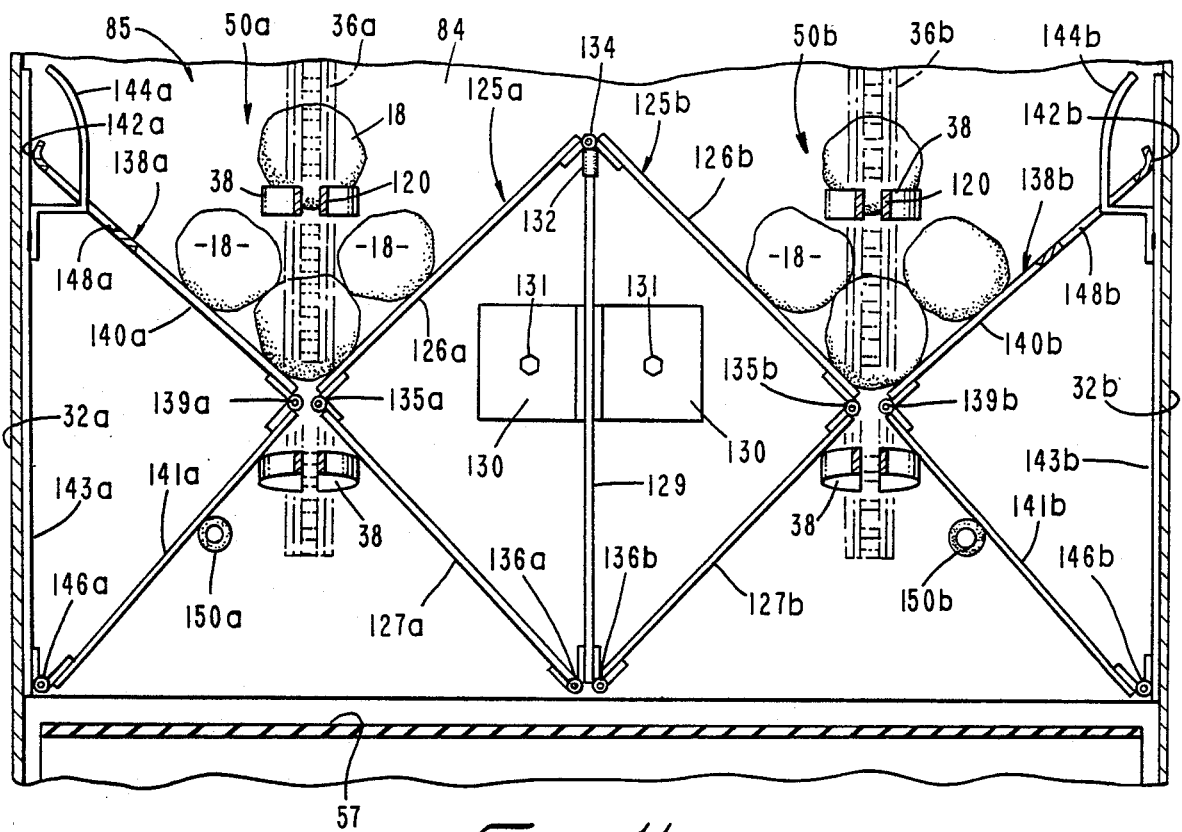
FIG. 11 is a rear elevation view of the pair of V shaped hoppers showing them in their relaxed position as taken along line 11—11 of FIG. 7B.

Reference will next be made to FIG. 11 to describe the structure of the hoppers 50a and 50b that reside in the rectangular opening 85 defined within the lower portion of the elevator housing 30 by the front vertical wall 84, the back vertical wall 35 and the side vertical walls 32a and 32b of the elevator housing 30 (FIGS. 5 and 7B). As shown in FIG. 11, the rectangular opening 85 has a central vertical wall 129 attached to the front wall 84 (FIG. 14) thereof by a pair of corner brackets 130. Each corner bracket 130 has one of its sides welded to one side surface of the central vertical wall 129 and the other of its sides attached to the front wall 84 by a nut and bolt assembly 131. The rectangular opening 85 also has vertical sidewalls 143a and 143b, provided with upwardly directed fingers 144a and 144b on the upper end portions thereof, attached to the respective inner sidewalls 32a and 32b of the elevator housing 30.

As shown in FIG. 11, located within the rectangular opening on either side of the central vertical wall 129 is a parallelogram structure comprised of central linkages 125a and 125b. The central linkage 125a includes a lower angularly disposed rectangular plate 127a joined by a hinge to an upper angularly disposed rectangular plate 126a to provide a hinged corner joint 135a. Likewise, the central linkage 125b includes a lower angularly disposed rectangular plate 127b joined by a hinge to an upper angular disposed rectangular plate 126b to provide a hinged corner joint 135b. Each of the rectangular plates 127a, 126a, 127b and 126b is of the same length and width. This width is approximately equal to the average diameter of a dough ball 18 but less than the spacing between the front wall 84 and the back wall 35 of the rectangular opening 85. The rectangular plates are typically 7"×2" strips of 18 gauge stainless steel.

The central linkage 125a has the bottom end of its lower angularly disposed rectangular plate 127a pivotally connected to one bottom side of the central vertical wall 129 and has the top end of its upper angularly disposed rectangular plate 126a connected to one end of a top hinge 134 shown lying on the top of the central vertical wall 129. The other central linkage 125b has the bottom end of its lower angularly disposed rectangular plate 127b pivotally connected to the other bottom side of the central vertical wall 129 and has the top end of its upper angularly disposed rectangular plate 126b connected to the other end of top hinge 134. It should be noted that hinge 134 sits on the top of the central plate 129 but is not connected to it.

Located within the rectangular opening 85 on each of its vertical sidewalls 143a and 143b so as to be positioned opposite the central linkages 125a and 125b are end linkages 138a and 138b. Similarly to each of the central linkages, the end linkage 138a includes a lower angularly disposed rectangular plate 141a joined by a hinge to an upper angularly disposed rectangular plate 140a to provide a hinged corner joint 139a. Likewise, the end linkage 138b includes a lower angularly disposed rectangular plate 141b joined by a hinge to an upper angularly disposed rectangular plate 140b to provide a hinged corner joint 139b.

It should be noted that the sizes of the rectangular plates in the end linkages are the same as those in the central linkages. The only difference is that the upper end portions of the upper angularly disposed rectangular plates 140a and 140b of each of the end linkages 138a and 138b are respectively provided with an elongated slot 148a and 148b (FIG. 15).

The end linkage 138a has the bottom of its lower angularly disposed rectangular plate 141a pivotally connected by hinge 146a to the bottom of vertical sidewall 143a and has the top end 142a of its upper angularly disposed plate 140a confined to freely move along the upper end portion of vertical sidewall 143a by hooking the elongated slot 148a on the upper end portion of rectangular plate 140a on the upwardly directed finger 144a provided on the vertical sidewall 143a. Likewise, the end linkage 138b has the bottom of its lower angularly disposed rectangular plate 141b pivotally connected by hinge 146b to the bottom of vertical sidewall 143b and has the top end 142b of its upper angularly disposed plate 140b confined to freely move along the upper end portion of vertical sidewall 143b by hooking the elongated slot 148b on the upper end portion of rectangular plate 140b on the upwardly directed finger 144b provided on the vertical sidewall 143b (FIG. 15).

Next to be noted is that since the hinged upper and lower angularly disposed rectangular plates forming each of the central and end linkages of the hoppers are not self supporting on the vertical walls on which they reside, means are provided to limit the downward pivoting movement of each of the lower angularly disposed rectangular plates so that their inwardly directed opposing hinged corner joints are positioned adjacent to each other when in their lowermost position or rest position. Thus, in order to make sure that each of the lower angularly disposed rectangular plates 141a and 141b of the end inkages 138a and 138b is held in its desired position with its hinged corner joints 139a and 139b respectively poitioned adjacent the opposite hinged corner joints 135a and 135b of the central linkages 125a and 125b, a rubber coated stop pin 150a and 150b is attached to extend from the front wall 84 (FIG. 15) for limiting the downward pivoting movement thereof.

It should now be clear that the reason for connecting the upper ends of the upper angularly disposed rectangular plates 126a and 126b of the central linkages 125a and 125b together by top hinge 134 which is only free to move up above the top of the central vertical wall 129 is because such a top hinged connection upon contacting the top of the central vertical wall 129 provides for also limiting the downward pivoting movement of the lower angularly disposed rectangular plates 127a and 127b to their desired rest position.

The overall operation of the machine 10 will next be described by reference to FIGS. 7A and 7B which are showings of the front longitudinal portion and rear longitudinal portion respectively of machine 10 as taken along line 7—7 of FIG. 3. Thus, as shown in FIG. 7A, as many as 100–120 dough balls 18 may be manually transferred by a spatula from a tray onto the surface of the input conveyor belt 22. It should be noted that the dough balls are not uniformly round. As a result, the dough balls are closely positioned in a random manner to fill the surface of the input conveyor belt 22 with approximately eight dough balls across the width thereof and approximately fourteen dough balls along the length thereof. Note that the non-uniformly round dough balls that may be passing through the machine 10 to a flattening machine to provide average size tortillas are about 2" in diameter but dough balls may be processed in the machine that have diameters varying between 1 ½" to 2 ½" in diameter.

With the input conveyor belt 22 so loaded with dough balls 18, the motor M is turned on and the clutch handle 66 is engaged. Thus, the input conveyor belt 22 is being slowly advanced at a speed of about 6" per minute, the rotating fingers 71 are being slowly rotated through the spacings of the stationary fingers 68 and the stationary rods 75 about 4 times per minute, the transverse rods 81 in the flour trough 26 are being rotated past the lower circular bottom 27 thereof to force the flour through the perforations 29, the second conveyor belt 28 is being advanced at a speed of about 14" per minute which is more then twice the speed of movement of the first input conveyor belt, and the excess flour return conveyor belt 57 is being advanced to convey flour collected thereon into the collector 108 on the front of the machine where the shaft 110 with the helical blade 111 is being rotating to push the flour collected therein into the bucket 115 that is detachably held on the front corner of the frame housing. Moreover the elevator chains 36a and 36b are typically advancing at about 84" per minute to move the cups 38 up through the bottoms of the hoppers 50a and 50b.

As the input conveyor belt 22 slowly advances, the dough balls 18 thereon fall off the rear end thereof onto the spaced stationary bent fingers 69 provided on the transverse bottom of the ledge structure 67 so as to position themselves in the spaces between adjacent pairs of fingers 69. The dough balls are held on the ledge structure 67 until the spaced rotating fingers 71 on shaft 70 periodically move up through the respective pairs of stationary fingers 69 and simultaneously lift the dough balls held thereon and transfer them to the spaced rods 77 which direct them to the faster moving second conveyor belt 28 where they are deposited in a row that is distributed across the width of the belt. Note further that because of the higher speed of the second conveyor belt each row of dough balls is deposited so as to be longitudinally spaced from the previously deposited row on the second conveyor belt.

It should now be understood that when the rotating fingers 71 pass through the respective pairs of stationary fingers of the ledge structure to lift the dough balls and transfer them to spaced rods 77 which direct them onto the second conveyor belt 28, these dough balls may not necessarily lie in a straight row across the belt but, in any event, the dough balls are distributed so that they extend across the width of the belt and each row is longitudinally spaced from the previous row of dough balls deposited on the belt.

The dough balls 18 on the second conveyor belt 28 are now moved underneath the flour trough 26 provided with rotating transverse rods 81 where they have their surface dusted with flour dropping out of the perforations 29 thereof. This dusting of flour is needed on the dough balls in preparation for their eventually entering a flattening machine.

As seen in FIG. 7B, as each row of dough balls distributed across the width of the conveyor belt 28 (FIG. 5) reaches the end of its travel, the dough balls drop down into the side-by-side hoppers 50a and 50b resulting, most of the time, in four dough balls entering each of the hoppers.

Figure 12:
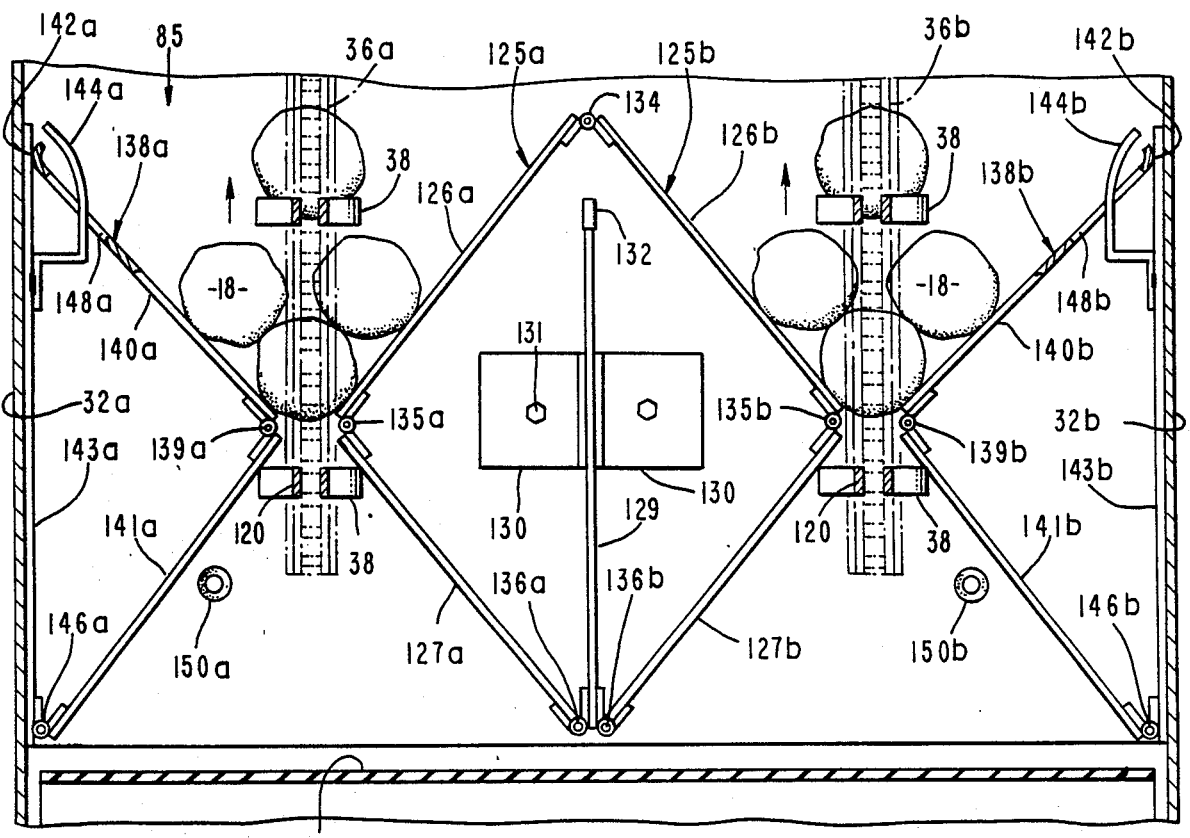
FIG. 12 is a rear elevation view of the V shaped hoppers showing their V bottoms being opened up by the sides of an ascending cup on each elevator chain contacting the pivotally held lower angularly disposed rectangular plates located below each of the hoppers.

Reference will next be made to FIGS. 11, 12 and 13 to explain the cooperation of the cups 38 and the hoppers 50a and 50b as viewed from the rear thereof. On viewing FIG. 11, note that the central linkages 125a and 125b and the end linkages 138a and 138b are in their rest position in which the top hinge 134 is resting on the top 132 of the central vertical wall 129 and the lower angularly disposed rectangular plates 141a and 141b of the end linkages 138a and 138b are resting on stop pins 150a and 150b, respectively. As a result, the opposing hinged corner joints 139a, 135a and 135b and 139b of the respective hoppers 50a and 50b are positioned adjacent each other. Next, note that one of the dough balls that was previously residing in the lower V bottom of each of the hoppers has already been picked up by a cup 38 on each of the upwardly moving chains 36a and 36b. Moreover, note that of the remaining three dough balls left in each hopper, one has repositioned itself in the lower V bottom thereof with the other two lying thereabove.

Reference will next be made to FIG. 12 which shows that as the elevator chains 36a and 36b continue to move upwardly, the sides of the following cup 38 on each of the chains contact the lower angularly disposed rectangular plates 141a, 127a and 127b, 141b located below the respective hoppers 50a and 50b and cause them to pivot upwardly about their respective lower hinges 146a, 136a and 136b, 146b by which they are connected to the bottom of the vertical sidewall 143a and one bottom surface of the central vertical wall 129, and the vertical sidewall 143b and the other bottom surface of the central vertical wall 129, respectively. This results in the opposing hinged corner joints 139a, 135a and 139b, 135b, that normally form the V bottom of each of the hoppers 50a and 50b by being adjacent to each other when in their rest condition, to spread apart, as shown. This causes the top hinge 134 which joins the tops of the upper angularly disposed rectangular plates 126a and 126b of each of the hoppers to be vertically lifted above the top 132 of the central vertical plate 129, and also causes the top ends 142a, 142b of the upper angularly disposed rectangular plates 140a, 140b of each of the hoppers 50a, 50b to slide upwardly along the upper surfaces of the respective vertical sidewalls 143a, 143b while being retained by their elongated slots 148a, 148b that are hooked on the fingers 144a, 144b provided on the upper portions of the end vertical walls 143a, 143b. Note that as each ascending cup 38 opens up the V bottom of each hopper in FIG. 12, it remains in contact with the respective lower angularly disposed rectangular plates 141a, 127a and 141b, 127b thereof until the dough ball located in the V bottom of each hopper becomes seated in the cup (FIG. 13).

Once the cups shown in FIG. 13 with the dough balls seated thereon start to ascend up into the hoppers 50a and 50b, since there no longer is an upward force exerted on the lower angularly disposed rectangular plates 141a, 127a and 127b, 141b of the respective hoppers 50a and 50b, the hinged upper and lower angularly disposed rectangular plates of the central linkages 125a and 125b and the end linkages 138a and 138b immediately settle due to gravity back down to their rest position, as shown in FIG. 11. In this rest position, the top hinge 134 that joins the top ends of the upper angularly disposed rectangular plates 126a and 126b of the respective central linkages 125a and 125b again rests on the rubber covered top 132 of central vertical wall 129 and the lower angularly disposed rectangular plates 141a, 141b of the respective end linkages 138a and 138b again contact the stop pins 150a and 150b. Also, the opposing corner side hinges 139a, 135a and 139b, 135b again lie adjacent to each other. It should be also noted that once the cups 38 with the dough balls seated thereon, as shown in FIG. 13, ascend up into the hoppers, the remaining two dough balls reposition themselves therein with one located in the lower V bottom thereof and the other lying thereover. The relative speed of the conveyor belts 22 and 28 and the elevator chains 36a and 36b are designed so that prior to the last dough ball being lifted out of each of the hoppers by the ascending cups on the chains 36a and 36b, another row of dough balls is dropped off of the rear of the second conveyor belt 28 so as to provide four more dough balls in each of the hoppers.

As shown in FIG. 7B, as the second conveyor belt 28 advances to cause a row of dough balls thereon to drop into the hoppers 50a and 50b, the scraper 82 extending from the front wall 84 of the rectangular opening 85 in which the hoppers reside causes any excess flour on the conveyor belt 28 to fall through the clearance space provided between the front and rear walls 84 and 35 onto the upwardly moving surface of the third conveyor belt 57 located therebelow. This third conveyor belt thus carries this excess flour back to the front of the machine, as shown in FIG. 7A, where the scraper 109 extending from the rear top edge of the collector 108 serves to scrape the flour off the surface of the conveyor belt 57 and direct it into the collector 108. The helical blade 111 on the rotating shaft 112 within collector 108 moves the flour such that it falls through an end hole 114 into the bucket 115 detachably held on the front of the main housing 11.

As viewed in FIG. 7B, as each of the cups 38 carrying a dough ball is elevated by its chain 36a and 36b up through the elevator housing 30 into the area between the side elbow enclosures 31a and 32b, the dough balls are dropped into the chutes 44a and 44b which direct them to the input of a flattening machine.

The rate at which dough balls need to be individually delivered through each of the chutes 44a and 44b to the input of the flattening machine determines the speed of the pair of elevator chains 36a and 36b carrying the cups 38. This speed is controlled by the speed control knob 54 provided on the rear of the side elbow enclosure 31a which is connected by cable 55 to control the speed of the main drive shaft from the gear box which is driven by the motor M. Because the chain drives provided for all the rotating elements of the machine including the elevator chains 36a and 36b, as well as the input conveyor belt 22 and the second conveyor belt 28, all are driven off the same main drive shaft, changing the speed of the main drive shaft 88 to change the speed of the elevator chains 36a and 36b also proportionally changes the speed of the conveyor belts.

Another reason one might want to change the speed of the elevator chains 36a and 36b by use of the speed control knob 54 is when it is desired to change the size of the tortillas to be formed on the flattening machine by providing smaller size dough balls 18. Thus when it is desired, for example, to make smaller tortillas, it is possible to operate the flattening machine at a faster speed and, therefore, the dough balls need to be fed into the flattening machine at a faster rate.

It should be noted that the number of dough balls in each row of dough balls being transferred by the rotating fingers 71 from the stationary fingers 69 of the ledge structure 67 can vary. If it happens that over a period of time more dough balls are transferred into the hoppers 50a and 50b than are removed by the cups on the elevator chains 36a and 36b, an overload condition could result. This situation can be alleviated by making use of the clutch 65. Thus, if an overload of doughballs is sensed in the hoppers, by disengaging the clutch, the operator can stop the movement of the input conveyor belt 22 and the second conveyor belt 28 and thereby stop the transfer of any more dough balls into the hoppers while still keeping the elevator chains 36a and 36b operating to individually pickup dough balls from the hoppers on the cups carried thereby and deliver them into the chutes 44a and 44b feeding the flattening machine. Once the number of dough balls in the hoppers has been reduced in this way, the operator can again engage the clutch so that the successive rows of dough balls on the second conveyor belt 28 can again start to drop into the hoppers.

Inasmuch as it takes about 3 to 4 minutes for the dough balls once placed on the input conveyor belt 22 to be individually delivered through the chutes 44a and 44b to the input of the flattening machine, this is more than enough time for the proofing of the dough balls to take place, i.e., for the dough from which the dough balls are formed to lighten up before being fed into the flattening machine.

In view of the above, it should now be clear that a plurality of many different round or substantially round objects, other than dough balls, can be dropped into a hopper structure constructed in accordance with the present invention and reliably picked up one at a time therefrom by spaced cups on an elevator chain for delivery to a place of use. Moreover, the rate of delivery of the objects can be readily changed as needed to meet any given application.

Although the foregoing disclosure has been concerned with a particular exemplary embodiment, it is to be understood that the invention is susceptible of many modifications and variations in both the construction and arrangement thereof. The invention, therefore, is not limited to the specific disclosure provided herein, but is to be considered as including all modifications and variations coming within the scope and spirit of the invention as defined in the appended claims.

What is claimed is:

1. A hopper structure comprising:
   front and rear transverse walls and vertical sidewalls defining a rectangular opening;
   a pair of opposing side angular members, each mounted on one of said vertical sidewalls;
   each side angular member including a lower inwardly and upwardly inclined wall joined to an upper outwardly and upwardly inclined wall to thereby provide opposing side corners that are normally lying adjacent to each other;
   the opposing upper outwardly and upwardly inclined walls of the opposing side angular members forming a V shaped hopper and the opposing side corners of the opposing side angular members forming a V bottom for the V shaped hopper; and
   wherein the spacing of said front and rear transverse vertical walls is such that when a plurality of substantially round objects is dropped into the V shaped hopper one settles in the V bottom thereof and the others are positioned thereover.

2. A hopper structure comprising:
   a rectangular opening having a front and rear transverse vertical wall and vertical sidewalls;
   a pair of opposing side angular members, each mounted on one end of said vertical sidewalls;
   each of the side angular members including a lower inwardly and upwardly inclined wall joined to an upper outwardly and upwardly inclined wall to thereby provide opposing side corners that are normally lying adjacent to each other;
   whereby the opposing upper outwardly and upwardly inclined walls of the opposing side angular members form a V shaped hopper and the opposing side corners of the opposing side angular members form a V bottom for the V shaped hopper; and wherein the spacing of said front and rear transverse vertical walls is such that when a plurality of substantially round objects is dropped into the V shaped hopper one settles in the V bottom thereof with the others positioned thereover;

an elevator chain carrying a cup along an ascending vertical path that is aligned with the V bottom of the V shaped hopper;

said cup upon contacting the lower inwardly and upwardly inclined walls of the opposing side angular members causing said opposing side corners to spread apart to enable said cup to move up into the V shaped hopper and lift out the object lying in the V bottom thereof; and said cup upon passing up into the V shaped hopper releasing the opposing side corners to return to their normal position wherein they lie adjacent to each other and moving out of the way of the objects left in the V shaped hopper so that they can resettle therein with one in the V bottom thereof and the others lying thereover.

3. A hopper structure for use in enabling substantially round objects contained therein to be picked up one at a time therefrom for delivery to a place of use, said hopper structure comprising:

a pair of spaced vertical sidewalls and a pair of spaced front and rear transverse vertical walls extending across corresponding lateral sides of said vertical sidewalls to form a rectangular opening, each said vertical sidewall having retaining means on the upper end thereof;

a pair of opposing linkages, one for each said vertical sidewall, each said linkage including a lower inwardly and upwardly inclined rectangular plate joined by a hinge to an upper outwardly and upwardly inclined rectangular plate to form a hinged corner joint;

each said linkage having the bottom of its lower inwardly and upwardly inclined rectangular plate pivotally joined by a hinge to the bottom of its vertical sidewall and having the top of its upper outwardly and upwardly inclined rectangular plate confined by the retaining means on the upper end of its vertical sidewall to movement along the vertical plane thereof; and means for limiting the downward pivoting movement of the lower inwardly and upwardly inclined rectangular plate of each said linkages about the bottom of its vertical sidewall such that the opposing hinged corner joints of the linkages lie adjacent to each other;

whereby the opposing upper outwardly and upwardly inclined rectangular plates define a V shaped hopper and the opposing hinged corner joints thereof form the V bottom thereof.

4. A hopper structure as defined in claim 3 wherein the means for limiting the downward pivoting movement of the lower inwardly and upwardly inclined rectangular plate on at least one of the linkages about the bottom of its vertical sidewall is a stop pin attached to one of said transverse vertical walls.

5. A hopper structure as defined in claim 3 wherein the retaining means on the upper end of at least one of the vertical sidewalls includes an upwardly directed finger which engages an elongated slot on the upper end portion of the upper outwardly and upwardly inclined rectangular plate of the linkage mounted on said vertical sidewall.

6. A hopper structure as defined in claim 3 wherein the spacing of said front and rear transverse vertical walls is such that when a plurality of substantially round objects are dropped into the V shaped hopper one settles in the V bottom thereof with the others lying thereover.

7. A hopper structure as defined in claim 6 including:

an elevator chain carrying a cup whose sides upon contacting the opposing lower inwardly and upwardly inclined plates of the linkages exerts an upward force that causes the opposing hinged corner joints on the linkages to spread apart so that the cup can ascend up into the V shaped hopper and lift out the object located in the V bottom thereof; and whereby once the cup ascends up into the V shaped hopper the linkages return by gravity to there lowermost operable position in which the opposing hinged corner joints thereof again lie adjacent to each other and the remaining objects in said hopper resettle therein with one in the V bottom thereof and the others lying thereover.

8. A hopper structure for enabling generally round objects contained therein to be picked up one at a time therefrom for delivery to a place of use, said hopper comprising:

a rectangular opening formed by front and rear vertical transverse walls and vertical sidewalls, each said vertical sidewall having a retaining means on the upper end thereof;

a pair of opposing linkages, one for each said sidewall;

each said linkage including an angularly disposed lower rectangular plate joined by a hinge to an angularly disposed upper rectangular plate to form a hinged corner joint;

each said linkage having the bottom end of its angularly disposed lower rectangular plate pivotally connected by a hinge to the bottom of its vertical sidewall and having the top end of its angularly disposed upper rectangular plate confined by the retaining means on the upper end portion of the vertical sidewall to an upward and downward movement along the vertical plane thereof in response to a force applied to the linkage; and means for limiting the downward pivoting movement of the angularly disposed lower rectangular plate of each said linkages about the bottom of its vertical sidewall to a rest position in which the opposing hinged corner joints of the linkages lie adjacent to each other;

whereby the opposing angularly disposed upper rectangular plates of the linkages define a V shaped hopper with the adjacent opposing hinged corner joints thereof forming the V bottom thereof;

wherein the spacing of the front and rear transverse vertical walls is such that when a plurality of generally round objects are dropped into the V shaped hoppers one settles in the V bottom thereof with the others lying thereover; and whereby when an upward force is exerted on the undersides of the opposing angularly disposed lower rectangular plates so as to cause them to pivot upwardly about their pivotal connections their opposing hinged corner joints are spread apart while the top ends of the angularly disposed upper rectangular plates move vertically upwardly and when the upward force is removed the opposing linkages return by gravity to their rest position in which their opposing hinged corner joints again lie adjacent to each other.

9. Apparatus for use in enabling dough balls to be picked up one at a time from each of a pair of hopper structures containing a plurality of dough balls, said apparatus comprising:

front and rear transverse vertical walls and a pair of vertical sidewalls defining a rectangular opening, each of said vertical sidewalls having an upwardly directed finger on the upper end portion thereof;

a central vertical wall disposed parallel to said vertical sidewalls for positioning said rectangular opening to form half rectangular openings;

a parallelogram structure comprised of a pair of central linkages respectively located on opposite sides of the central vertical wall, each central linkage including a lower angularly disposed rectangular plate joined by a hinge to an upper angularly disposed rectangular plate to form a hinged corner joint;

each central linkage having the bottom end of its lower angularly disposed rectangular plate pivotally connected to one bottom side of said central vertical wall and having the top end of its upper angularly disposed rectangular plate hinged to the top end of the upper angularly disposed rectangular plate of the central linkage located on the opposite side of the central vertical wall;

a pair of end linkages, one for each said vertical sidewall;

each said end linkage including a lower angularly disposed rectangular plate joined by a hinge to an upper angularly disposed rectangular plate to form a hinged corner joint;

each said end linkage having the bottom end of its lower angularly disposed rectangular plate pivotally connected by a hinge to the bottom of its vertical sidewall and having an elongated slot on the top end portion of its upper angularly disposed rectangular plate engaged on the finger provided on the upper end portion of the vertical sidewall;

a stop pin on said front transverse vertical wall for limiting the downward pivoting movement of the lower angularly disposed rectangular plate of the end linkages in each half rectangular opening about the bottom of its vertical sidewall, and said top hinge on said parallelogram structure contacting the top of the central vertical wall for limiting the downward movement of the upper angularly disposed rectangular plate of the central linkage of the hopper in each half rectangular opening such that the opposing hinged corner joints of the opposing linkages provided in each half rectangular opening lie adjacent to each other; and whereby the opposing upper angularly disposed rectangular plates in each half rectangular opening define a V shaped hopper with the adjacent opposing hinged corner joints thereof forming the V bottom thereof.

10. Apparatus as defined in claim 9 including:

an endless input conveyor belt having a rear end and carrying dough balls that are closely and randomly positioned on the surface thereof;

a ledge structure provided with spaced bent fingers on the lower edge thereof located at the rear of the input conveyor belt on which the dough balls fall and are stationarily held long enough to enable them to be aligned in a transverse row;

a declining guide member provided with spaced rods on the upper edge thereof;

an endless second conveyor belt having a rear end, said second conveyor belt moving faster than said input conveyor belt;

a rotating shaft carrying spaced rotating fingers thereon for periodically lifting the dough balls off the spaced bent fingers of the ledge structure and transferring them to the spaced rods on the guide member which deposits them in a transverse row on the second conveyor belt longitudinally spaced from a previous transverse row of dough balls deposited thereon; and a flour trough provided with a rotating member which causes flour to be sprinkled onto the dough balls being carried therepast by the second conveyor belt;

said rectangular opening enclosing one of said V shaped hoppers in each half thereof being located to receive the dough balls in each transverse row as they fall off the rear end of the second conveyor belt whereby the dough balls in each half of a transverse row enter one of the V shaped hoppers.

11. A dough ball feeding machine comprising:

a main housing having front and rear ends;

an endless input conveyor belt having its rear end pivotally mounted on the front end of said main housing such that it can be disposed to horizontally extend forwardly of the front end of the main housing;

an endless second conveyor belt having a rear end and mounted to extend through said main housing with at least its front end located below the level of the rear end of said input conveyor belt;

aligning and transferring means located below the rear end of said input conveyor belt and above the front end of the second conveyor belt;

a flour trough having perforations on its bottom mounted within said main housing above said second conveyor belt;

an elevator housing mounted within the rear end of the main housing so as to vertically extend thereabove, said elevator housing having on the top thereof rearwardly directed side elbow enclosures and having on the bottom thereof a rectangular opening formed by a front transverse wall, a rear transverse wall and sidewalls;

a pair of chutes provided in the spacing between the side elbow enclosures on the top of said elevator housing;

a pair of side-by-side V shaped hoppers comprised of opposing linkages residing within each half of said rectangular opening; and a pair of endless elevator chains carrying cups thereon, each elevator chain mounted within said elevator housing to ride on vertical guide channels provided on the rear wall of each half of said rectangular opening which extends up into the elevator housing and into the spacing between said side elbow enclosures;

whereby dough balls being carried on said input conveyor belt upon dropping off the rear end thereof are aligned and deposited in a transverse row on said second conveyor belt by the aligning and transferring means, whereby the dough balls being carried by the second conveyor belt after being sprinkled with flour on passing under the flour trough are dropped off the rear end of the second conveyor belt into the side-by-side V shaped hoppers, and whereby each of the cups of the elevator chains upon passing through the opposing linkages of each of the V shaped hoppers lift the dough balls one at a time therefrom and drop them into the chutes for delivery to a place of use.

12. A dough ball feeding machine as defined in claim 11 including:
   a forwardly extending scraper on the top of the front wall of said rectangular opening which contacts the second conveyor belt;
   a third endless conveyor belt having its front end mounted on the rear end of the main housing below the hoppers and having its rear end extending to the front end of said main housing; and
   a transverse flour collector mounted on the front end of said main housing below the third conveyor belt, said collector having a rearwardly extending scraper on the rear thereof which contacts the third conveyor belt;
   whereby loose flour on the second conveyor belt scraped off by the forwardly extending scraper falls through said rectangular opening onto said third conveyor belt which carries the loose flour to the front of the main housing where the rearwardly extending scraper scrapes it off the third conveyor belt and directs it into the collector.

13. A dough ball feeding machine as defined in claim 11 including:
   a side compartment on each side of said main housing;
   a motor and a gear box with a speed control unit mounted on the interior rear bottom of said main housing, said gear box having a main drive shaft;
   a first chain drive system driven off the main drive shaft to rotate a drive shaft that advances the elevator chains carrying the cups in the elevator housing which pick up the dough balls one at a time out of each of the V shaped hoppers;
   a clutch mounted within one of the side compartments having a handle extending thereabove; and
   a second chain drive system mounted within the side compartments and coupled by said clutch when engaged to be driven off the drive shaft for advancing the elevator chains, said second chain drive system providing for advancing the input conveyor belt and the second conveyor belt which carry the dough balls into the V shaped hoppers;
   whereby when an overload of dough balls is present in the V shaped hoppers, the clutch can be disengaged by its handle to stop the advancement of the input conveyor belt and the second conveyor belt and thereby terminate the supplying of additional dough balls into the V shaped hoppers while the elevator chains carrying the cups continue to operate to carry dough balls out of the V shaped hoppers.

14. A dough ball feeding machine as defined in claim 11 wherein said aligning and transferring means comprises:
   a transverse ledge structure having a plurality of upwardly bent fingers spaced along its lower edge;
   a rotatably mounted transversely oriented shaft having fingers spaced along the length thereof; and
   a transverse declining guide member having a plurality of rods spaced along its upper edge;
   whereby during the operation of the machine the dough balls that drop off the rear end of the input conveyor belt fall onto the ledge structure and the fingers on the rotating shaft pass between the spaced upwardly bent fingers on the ledge structure and lift the dough balls therefrom and transfer them to the declining guide member as they pass between the spaced guide rods which directs them onto the second conveyor belt.

15. A dough ball feeding machine as defined in claim 11 wherein:
   said flour trough has a rotatable shaft extending transversely through the circular bottom portion thereof;
   said rotatable shaft has diametric bars located on the interior ends thereof; and
   transverse rods are mounted across the ends of the diametric bars;
   whereby during the operation of the machine the transverse rods move along the interior rounded bottom portion of the trough and cause flour therein to be sprinkled on dough balls being carried therepast by the second conveyor belt.

* * * * *